United States Patent
Lee et al.

(10) Patent No.: US 9,415,672 B2
(45) Date of Patent: Aug. 16, 2016

(54) BATTERY MOUNTING UNIT FOR VEHICLE

(71) Applicants: Hyundai Motor Company, Seoul (KR); Kia Motors Corporation, Seoul (KR)

(72) Inventors: Seungwon Lee, Yongin-si (KR); Mincheol Kim, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 14/551,037

(22) Filed: Nov. 23, 2014

(65) Prior Publication Data

US 2016/0075223 A1 Mar. 17, 2016

(30) Foreign Application Priority Data

Sep. 15, 2014 (KR) .................. 10-2014-0122244

(51) Int. Cl.
*B60R 16/04* (2006.01)
*B60K 1/04* (2006.01)

(52) U.S. Cl.
CPC ............ *B60K 1/04* (2013.01); *B60K 2001/0416* (2013.01)

(58) Field of Classification Search
CPC ............. B60K 1/04; B60K 2001/0416; B62K 2208/00; B60R 16/04
USPC ...................................................... 180/68.5
See application file for complete search history.

(56) References Cited

U.S. PATENT DOCUMENTS

| | | | | |
|---|---|---|---|---|
| 4,317,497 A * | 3/1982 | Alt | ...................... | H01M 2/1083 180/68.5 |
| 6,431,300 B1 * | 8/2002 | Iwase | ...................... | B60K 1/04 180/68.5 |
| 6,648,090 B2 * | 11/2003 | Iwase | ...................... | B60K 1/04 180/68.5 |
| 7,331,559 B2 * | 2/2008 | Hirayu | ..................... | B60R 16/04 180/68.5 |
| 8,413,751 B2 * | 4/2013 | Jufuku | ..................... | H01M 8/00 180/68.5 |
| 8,632,902 B2 * | 1/2014 | Wendorf | ............. | H01M 2/1083 429/100 |
| 8,960,350 B2 * | 2/2015 | Kosaki | ..................... | B60K 1/04 180/65.22 |
| 8,960,351 B1 * | 2/2015 | Maeda | ..................... | B60R 16/04 180/68.5 |
| 9,073,498 B2 * | 7/2015 | Lee | ......................... | B60R 16/04 |

FOREIGN PATENT DOCUMENTS

| | | |
|---|---|---|
| JP | 5-70515 U | 9/1993 |
| JP | 2003-205800 A | 7/2003 |
| JP | 3736418 B2 | 11/2005 |
| JP | 3918293 B2 | 2/2007 |
| JP | 2012-41025 A | 3/2012 |
| KR | 10-2006-0049363 A | 5/2006 |

* cited by examiner

*Primary Examiner* — Hau Phan
(74) *Attorney, Agent, or Firm* — Morgan, Lewis & Bockius LLP

(57) ABSTRACT

A battery mounting unit for a vehicle may include a front bracket bonded to a top of a rear floor panel of a vehicle body and having a through-hole penetrated together with the rear floor panel, a reinforcing bracket bonded to an inner side of a rear floor side member on a bottom of the rear floor panel to correspond to the front bracket and having a welding nut on a bottom corresponding to the through-hole of the front bracket, a rear bracket bonded to an outer surface of the rear floor side member and having a plurality of welding nuts on a lower side of a top thereof, a battery tray fastened to the plurality of welding nuts on the rear bracket by a bolt and seated with a battery, and a battery clamper joined to the battery tray to fix the battery to the battery tray.

6 Claims, 6 Drawing Sheets

BATTERY MOUNTING UNIT FOR VEHICLE

CROSS-REFERENCE TO RELATED APPLICATION

The present application claims priority to and the benefit of Korean Patent Application No. 10-2014-0122244 filed on Sep. 15, 2014, the entire contents of which is incorporated herein for all purposes by this reference.

BACKGROUND OF THE INVENTION

1. Field of the Invention

The present invention relates to a battery mounting unit for a vehicle, and more particularly, to a battery mounting unit for a vehicle that improves mounting rigidity by inducing a decrease in mounting height of the battery mounting unit mounted on a vehicular rear floor panel and a rear floor side member.

2. Description of Related Art

In general, a battery for supplying electricity to a motor and various electric devices is installed in a vehicle body of a vehicle according to a load balance of the vehicle.

FIG. 1 is a projection perspective view of a battery mounting unit for a vehicle in the related art.

Referring to FIG. 1, the battery mounting unit 100 for a vehicle in the related art includes a battery tray 103 and a battery clamper 105 in which a battery 101 is easily attachable and detachable, and the battery tray 103 and the battery clamper 105 are fixed onto a rear floor panel 201 and a rear floor side member 203 of a vehicle body.

The battery tray 103 is fixedly installed through a front bracket 301 installed on the top of the rear floor panel 201 and a rear bracket 303 installed on the top of the rear floor side member 203.

That is, the front bracket 301 and the rear bracket 303 are bonded to the tops of the rear floor panel 201 and the rear floor side member 203, respectively by welding, and the like.

Further, the battery tray 103 and the battery clamper 105 are fastened to the tops of the front bracket 301 and the rear bracket 303 by a bolt B.

However, since the front bracket 301 in the related art needs to secure a spare gap from the rear floor panel 201 as large as a length of the bolt B which protrudes downward during fastening the bolt B, a mounting height of the battery 101 needs to be increased.

That is, the increase in the battery mounting height causes insufficiency of support points between the front bracket 301 and the rear floor panel 201 to degrade mounting rigidity and when a through-hole is formed on the rear floor panel 201 in order to avoid interference between the bolt B and the rear floor panel 201, another problem such as inflow of exhaust gas or generation of abnormal noise may be caused.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a battery mounting unit for a vehicle that fastens front sides of a battery tray and a battery clamper together with a rear floor panel by adding a separate reinforcing bracket with a welding nut on the bottom of the rear floor panel corresponding to a front bracket to decrease an overall battery mounting height.

The present invention has also been made in an effort to provide a battery mounting unit for a vehicle that forms a rigidity reinforcing unit at a front bracket by forming molding to secure rigidity of the battery mounting unit and secures a rear floor panel and a wide support surface to secure joining rigidity of a battery tray.

In an aspect of the present invention, a battery mounting unit for a vehicle, may include a front bracket bonded to a top of a rear floor panel of a vehicle body and having a through-hole penetrated together with the rear floor panel at a center thereof, a reinforcing bracket bonded to an inner side of a rear floor side member on a bottom of the rear floor panel to correspond to the front bracket and having a welding nut on a bottom corresponding to the through-hole of the front bracket, a rear bracket bonded to an outer surface of the rear floor side panel and having a plurality of welding nuts on a lower side of a top thereof, a battery tray fastened to the plurality of welding nuts on the rear bracket by a bolt and seated with a battery, and a battery clamper of which both ends are joined to the battery tray to fix the battery to the battery tray.

The front bracket may have a rigidity reinforcing unit forming-molded upward on a circumference based on the through-hole and is welded onto the rear floor panel through a reference plane where the through-hole is formed.

The reinforcing bracket may have the welding nut embedded on a top of the reinforcing bracket corresponding to the through-hole of the front bracket and is welded on an inner surface of the rear floor side member through welding ends formed on edges of both sides bent downward.

Holes are formed at centers of both sides of the reinforcing bracket.

The rear bracket may have a tray seating surface on which the battery tray is seated, which is formed on the top on a horizontal line to the rigidity reinforcing unit of the front bracket, is bonded to an outer surface of the rear floor side panel through a bonding end formed on the circumference, and is embedded in a plurality of welding nuts each of both sides of the tray seating surface.

In the battery clamper, one end thereof is fastened on an outer top of the battery tray and another end is fastened to the welding nut of the reinforcing bracket together with an inner end of the battery tray and the front bracket by a bolt.

According to an exemplary embodiment of the present invention, front sides of a battery tray and a battery clamper are fastened together with a rear floor panel by adding a separate reinforcing bracket with a welding nut on the bottom of the rear floor panel corresponding to a front bracket to decrease an overall battery mounting height, thereby securing a design layout.

Further, a rigidity reinforcing unit is formed at a front bracket by forming molding to secure rigidity of the battery mounting unit and a rear floor panel and a wide support surface are secured to secure joining rigidity with a battery tray.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
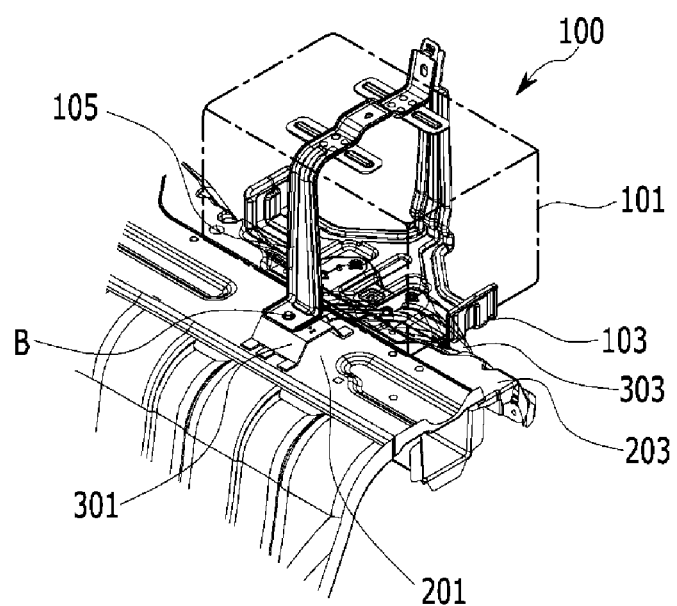
FIG. 1 is a projection perspective view of a battery mounting unit for a vehicle in the related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, an exemplary embodiment of the present invention will be described in detail with reference to the accompanying drawings.

However, parts which are not related with the description will not be omitted for clearly describing the exemplary embodiment of the present invention.

Figure 2:
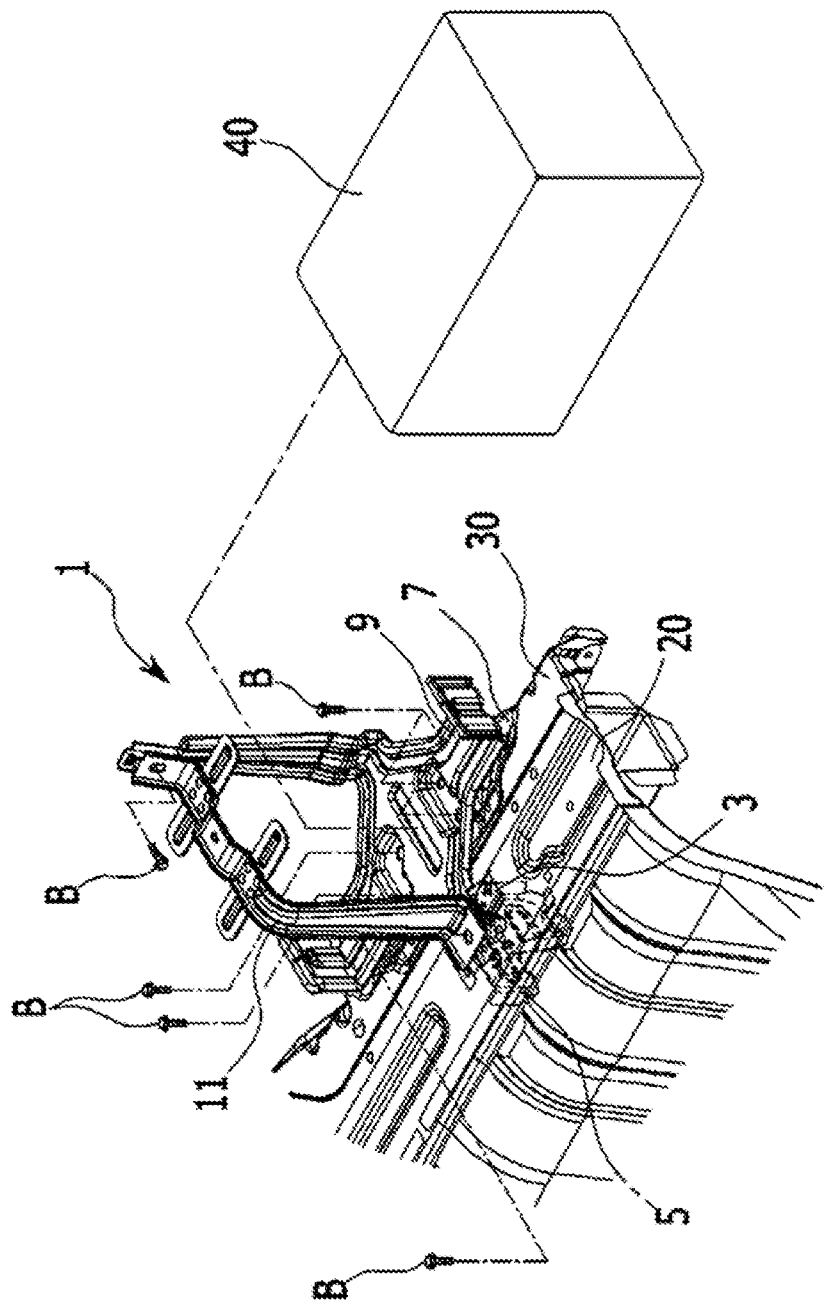
FIG. 2 is a projection perspective view of an assembly state of a battery mounting unit for a vehicle according to an exemplary embodiment of the present invention.
Figure 3:
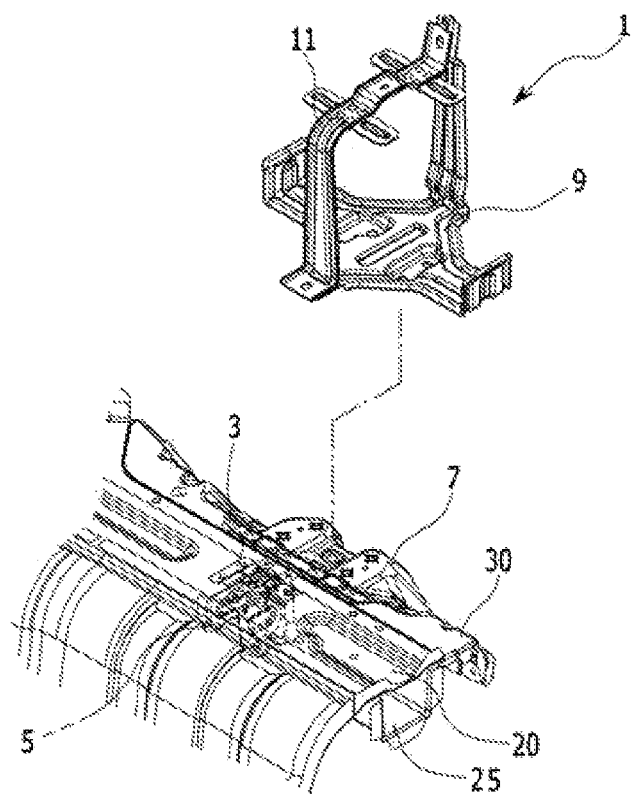
FIG. 3 is a partial exploded projection perspective view of a battery mounting unit for a vehicle according to the exemplary embodiment of the present invention.

FIG. 2 is a projection perspective view of an assembly state of a battery mounting unit for a vehicle according to an exemplary embodiment of the present invention and FIG. 3 is a partial exploded projection perspective view of a battery mounting unit for a vehicle according to the exemplary embodiment of the present invention.

Referring to FIGS. 2 and 3, the battery mounting unit 1 for a vehicle according to the exemplary embodiment of the present invention includes a front bracket 3, a reinforcing bracket 5, a rear bracket 7, a battery tray 9, and a battery clamper 11.

In the battery mounting unit 1 for a vehicle, the front bracket 3 is mounted on a rear floor panel 20 of a vehicle body, and the reinforcing bracket 5 and the rear bracket 7 are mounted on a rear floor side panel 30.

In addition, the battery tray 9 and the battery clamper 11 are installed on the tops of the front bracket 3 and the rear bracket 7.

Figure 4:
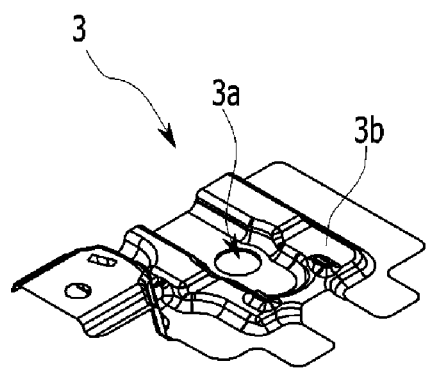
FIG. 4 is a perspective view of a front bracket applied to the battery mounting unit for a vehicle according to the exemplary embodiment of the present invention.

FIG. 4 is a perspective view of a front bracket of the battery mounting unit for a vehicle according to the exemplary embodiment of the present invention.

Referring to FIG. 4, the front bracket 3 is bonded to the top of the rear floor panel 20 and has a through-hole 3a which is penetrated together with the rear floor panel 20 at the center thereof.

In addition, the front bracket 3 has a rigidity reinforcing unit 3b forming-molded upward on the circumference based on the through-hole 3a and is welded and bonded onto the rear floor panel 20 through a reference plane where the through-hole 3a is formed.

Figure 5:
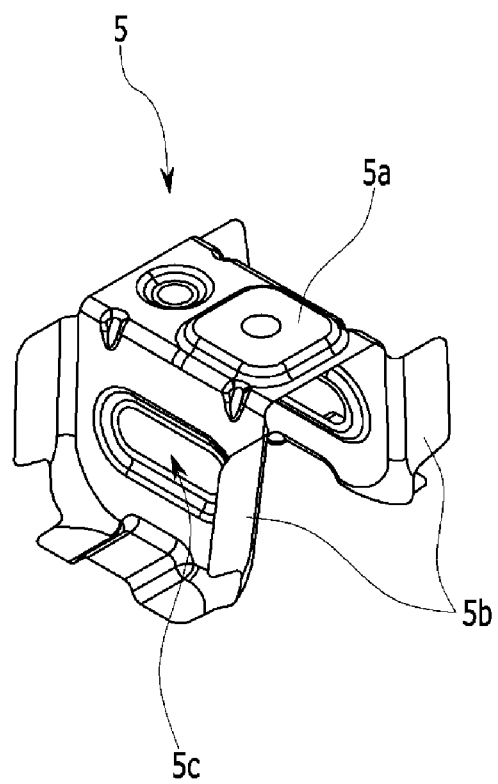
FIG. 5 is a perspective view of a reinforcing bracket applied to the battery mounting unit for a vehicle according to the exemplary embodiment of the present invention.

FIG. 5 is a perspective view of a reinforcing bracket of the battery mounting unit for a vehicle according to the exemplary embodiment of the present invention.

Referring to FIG. 5, the reinforcing bracket 3 is bonded to an inner side of the rear floor side member 25 on the bottom of the rear floor panel 20 to correspond to the front bracket 3 and a welding nut 5a is configured to correspond to the through-hole 3a of the front bracket 3.

That is, the welding nut 5a is embedded on the top of the reinforcing bracket 5 corresponding to the through-hole 3a of the front bracket 3.

Further, in the reinforcing bracket 5, welding ends 5b are formed on edges of both sides which are bent downward and the reinforcing bracket 5 is welded and bonded to an inner surface of the rear floor side member 25 through the welding ends 5b.

In addition, long holes 5c are formed at the centers of both sides of the reinforcing bracket 5 so as to save a material without influencing rigidity.

Figure 6:
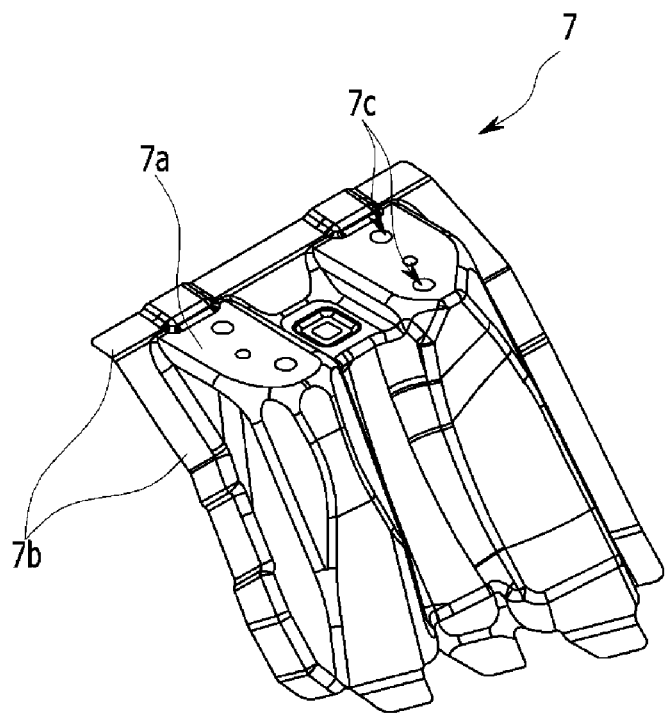
FIG. 6 is a perspective view of a rear bracket applied to the battery mounting unit for a vehicle according to the exemplary embodiment of the present invention.

FIG. 6 is a perspective view of a rear bracket of the battery mounting unit for a vehicle according to the exemplary embodiment of the present invention.

Referring to FIG. 6, the rear bracket 7 is bonded to an outer surface of the rear floor side panel 30 and has a plurality of welding nuts 7c at a lower side of the top thereof.

The top of the rear bracket 7 is positioned on a horizontal line to the rigidity reinforcing unit 3b of the front bracket 3, and the top is formed by a tray seating surface 7a on which the battery tray 9 is seated, and bonded to the outer surface of the rear floor side panel 30 through a bonding end 7b formed on the circumference.

Herein, two welding nuts 7c are embedded at each of both sides of the tray seating surface 7a.

Referring to FIGS. 2 and 3, the battery tray 9 is fastened to the welding nut 7c on the rear bracket 7 by a bolt B while the bottom thereof is seated on the tray seating surface 7a of the rear bracket 7 and the battery clamp 11 is fastened and fixed to the welding nut 5a on the reinforcing bracket 5 together with the rear floor panel 20 by the bolt B while one end thereof is seated on the top of the front bracket 3 together with one end of the battery tray 9.

In this case, the battery clamper 11 has a structure in which the other end of the battery clamper 11 is fastened on the outer top of the battery tray 9 by the bolt B to fix a battery 40.

In order to fix the battery 40 through the battery mounting unit 1 for a vehicle according to the exemplary embodiment of the present invention having the above configuration, the battery 40 is seated on the battery tray 9 while the battery clamper 11 is first separated from the battery tray 9 as illustrated in FIG. 2.

In this state, the battery clamper 11 is assembled to the battery tray 9 to fix the battery 40.

In this case, in the battery clamper 11, one end thereof is fastened to the battery tray 9 by the bolt B and the other end thereof is fastened to the welding nut 5a on the reinforcing bracket 5 by the bolt B by penetrating the rear floor panel 20 together with the front bracket 3.

In the battery mounting unit 1 for a vehicle according to the exemplary embodiment of the present invention, front sides of the battery tray 9 and the battery clamper 11 are fastened together with the rear floor panel 20 by adding a separate reinforcing bracket 5 having the welding nut 5a on the bottom of the rear floor panel 20 corresponding to the front bracket 3 to decrease an overall battery mounting height and secure the resulting design layout.

Further, a rigidity reinforcing unit 3b is formed at the front bracket 3 by forming molding to secure rigidity of the battery mounting unit and the rear floor panel 20 and a wide support surface are secured to increase joining rigidity with the battery tray 9.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. They are not intended to be exhaustive or to limit the invention to the precise forms disclosed, and obviously many modifications and variations are possible in light of the above teachings as well as various alternatives and modifications thereof. It is intended that the scope of the invention be defined by the Claims appended hereto and their equivalents.

What is claimed is:

1. A battery mounting unit for a vehicle, comprising:
   a front bracket bonded to a top of a rear floor panel of a vehicle body and having a through-hole penetrated together with the rear floor panel at a center thereof;
   a reinforcing bracket positioned under the rear floor panel and inserted into and bonded to an inner side of a rear floor side member on a bottom of the rear floor panel to correspond to the front bracket and having a welding nut on a bottom corresponding to the through-hole of the front bracket, wherein the rear floor panel is disposed between the front bracket and the reinforcing bracket;
   a rear bracket bonded to an outer surface of the rear floor side panel and having a plurality of welding nuts on a lower side of a top thereof;
   a battery tray fastened to the plurality of welding nuts on the rear bracket by a bolt and seated with a battery; and
   a battery damper of which both ends are joined to the battery tray to fix the battery to the battery tray.

2. The battery mounting unit of claim 1, wherein the front bracket has a rigidity reinforcing unit forming-molded upward on a circumference based on the through-hole and is welded onto the rear floor panel through a reference plane where the through-hole is formed.

3. The battery mounting unit of claim 2, wherein the rear bracket has a tray seating surface on which the battery tray is seated, which is formed on the top on a horizontal line to the rigidity reinforcing unit of the front bracket, is bonded to an outer surface of the rear floor side member through a bonding end formed on the circumference, and is embedded in a plurality of welding nuts each of both sides of the tray seating surface.

4. The battery mounting unit of claim 1, wherein the reinforcing bracket has the welding nut embedded on a top of the reinforcing bracket corresponding to the through-hole of the front bracket and is welded on an inner surface of the rear floor side member through welding ends formed on edges of both sides bent downward.

5. The battery mounting unit of claim 4, wherein holes are formed at centers of both sides of the reinforcing bracket.

6. The battery mounting unit of claim 1, wherein, in the battery clamper, one end thereof is fastened on an outer top of the battery tray and another end is fastened to the welding nut of the reinforcing bracket together with an inner end of the battery tray and the front bracket by a bolt.

* * * * *